United States Patent [19]
Hoshi et al.

[11] 3,912,675
[45] Oct. 14, 1975

[54] FLEXO INK COMPOSITION

[75] Inventors: Hiroshi Hoshi, Narashino; Sakae Sakakura, Omiya; Minoru Yoshida, Tokyo; Yoshinobu Monden, Kasukabe; Fumio Ito, Chiba; Kaoru Fujita, Ikeda, all of Japan

[73] Assignees: Sakata Shokai Ltd., Osaka; Lion Fat & Oil Co., Ltd., Tokyo, both of Japan

[22] Filed: May 24, 1973

[21] Appl. No.: 363,577

[30] Foreign Application Priority Data
May 29, 1972 Japan.................................. 47-53149

[52] U.S. Cl.................... 260/27 R; 106/29; 106/30; 106/31; 260/28.5 A
[51] Int. Cl.²......................................... C08L 93/00
[58] Field of Search........ 260/27 R, 28.5 A; 106/29, 106/30, 31

[56] References Cited
UNITED STATES PATENTS
2,868,741  1/1959  Chambers.............................. 106/30
3,412,053  11/1968  Pugliese................................ 106/29
3,533,811  10/1970  Clements........................... 260/27 R
3,764,587  10/1973  Zunker............................... 260/27 R

OTHER PUBLICATIONS

Apps, E. A., "Inks for the Minor Printing Processes & Specialized Applications," 1964, (pp. 2–4, 20, 25 & 111 relied upon).

Primary Examiner—Melvyn I. Marquis
Assistant Examiner—William E. Parker
Attorney, Agent, or Firm—Woodhams, Blanchard and Flynn

[57] ABSTRACT

A flexo ink composition suitable for use in printing on polyolefin sheets or polyolefin sheets containing an inorganic filler, comprising 5–35% by weight of acrylic resin and 5–20% by weight of at least one member selected from the group of natural resins consisting of copal, dammar and shellac as the resin component thereof.

3 Claims, No Drawings

FLEXO INK COMPOSITION

BACKGROUND OF THE INVENTION

1. Field of the Invention

The present invention relates to a flexo ink composition comprising acrylic resin and specific natural resins, as the resin component thereof, and which is superior in printability as well as film strength.

2. Description of the Prior Art

As the flexo ink compositions for use in the flexo printing process for high-speed printing on paper, aluminum foil or polyolefin sheet which has undergone a surface treatment such as a film treatment, corona discharge treatment, chromic acid treatment, etc., there have heretofore been known compositions comprising (a) polyamide resin and nitro cellulose, (b) nitro cellulose and rosin-modified maleic acid resin, (c) acrylic resin and ketone resin, and (d) shellac alone, as the resin component. However, these conventional compositions passes inadequate adhesive properties in relation to polyolefin sheets which have not undergone the surface treatment or a polyolefin sheet filled with an inorganic powder (hereinafter referred to as the composite material), and therefore they have failed to be of practical use.

SUMMARY OF THE INVENTION

The present invention is intended to overcome the foregoing defect of the conventional flexo inks and to provide a flexo ink composition which is superior in printing aptitude and which can display satisfactory adhesive properties and film strength even when applied to the aforesaid untreated polyolefin sheet and composite material.

To be precise, the present invention relates to a flexo ink composition comprising 5-35% by weight of acrylic resin and 5-20% by weight of at least one member selected from the group of natural resins consisting of copal, dammar and shellac, as the resin component thereof.

The acrylic resin for use in the present invention includes, for instance, methacrylic acid ester-acrylic acid copolymer. As the methacrylic acid ester constituting one component of the foregoing copolymer, ethyl, butyl, isobutyl, n-hexyl, n-octyl, lauryl and stearyl methacrylates are desirable, and particularly isobutyl methacrylate is effective. Among these copolymers, such ones as having a molecular weight in the range of 30,000–300,000 and a softening point (T g: second order transition temperature) in the range of 20°–105°C are appropriate. The compounding ratio of said copolymer is usually in the range of 5–35% by weight — preferably in the range of 15–25% by weight.

As the natural resin for use in the present invention, copal, dammar, shellac and their mixtures are applicable, and among these resins, dammar having an acid value in the range of 20–55 and a softening point in the range of 55°–110°C is particularly effective. The compounding ratio of said natural resin is usually in the range of 5–20% by weight — preferably in the range of 8–15% by weight.

According to the present invention, in addition to the foregoing resin component, a coloring material consisting of pigment or dyestuff; wax; additives such as an antifoaming agent; a plasticizer, and a solvent can also be mixed, and as such materials, those for use in the conventional flexo ink compositions are applicable. To be precise, as the pigment or dyestuff, such substances as dis-azo compound, Lake Red C, Carmine 6B, phthalocyanine, metal complex salt, Chrome Yellow, Iron Oxide Red, French Blue, Prussian Blue, calcium carbonate, barium sulfate, titanium oxide, carbon black, White Carbon, etc. are applicable. These substances are generally applied upon mixing according to color appearance. The appropriate compounding ratio on this occasion is in the range of 1–50% by weight.

As the wax for use in the present invention, such a wax as polyethylene wax, carbana wax, microcrystalline wax, etc. is mixed to the extent of 1–5% by weight.

As the antifoaming agent, such a substance as a higher alcohol like octyl alcohol, etc., silicone having dimethyl-siloxane—structure and the like is applicable. The appropriate compounding ratio of this antifoaming agent is in the range of 1–3% by weight in total.

As the plasticizer, one belonging to phthalic acid ester, such as dioctyl phthalate, is applied to the extent of 1–5% by weight.

As the solvent, a mixture consisting of an alcoholic solvent such as methyl, ethyl, isopropyl, n-propyl, n-butyl, isobutyl, t-butyl, diacetone or benzyl alcohol with at least one solvent of an ester type solvent such as ethyl acetate, butyl acetate, etc., an aromatic hydrocarbon type solvent such as toluene xylene etc.; and a glycol ether type solvent such as methyl, ethyl or butyl Cellosolve (the monomethyl, the monoethyl and the monosutyl ethers of ethylene glycol), etc. — that is, a mixed solvent consisting of at least two kinds of solvents (wherein the content of said alcoholic solvent is to be at least one third, by weight, of the total amount of the mixed solvent) — is applied to the extent of 30–60% by weight.

Besides, any known additive can of course be added to the composition as the occasion demands.

In order to produce a flexo ink composition under the present invention, vehicle A is first prepared by dissolving said acrylic resin in said mixed solvent, while vehicle B is prepared by dissolving said natural resin in said mixed solvent. Subsequently, vehicle A is mixed with vehicle B, and then said pigment or dyestuff is dispersed in the resulting mixture, followed by adding the wax, an antifoaming agent and a plasticizer and further adding the mixed solvent as the occasion demands to thereby adjust such properties as viscosity, color appearance, etc. In this connection, application of any solvent other than the foregoing mixed solvent would fail in effect to produce the intended ink composition.

Hereunder will be given comparative data of the flexo ink embodying the present invention and the conventional flexo ink with respect to the printability.

DESCRIPTION OF THE PREFERRED EMBODIMENTS

EXAMPLE 1.

Components:

| | |
|---|---:|
| acrylic resin (intrinsic viscosity: 0.067 softening point (T g): Trade Mark "MM 2002" by Fujikura Kasei Co., Ltd.) | 20 wt.% |
| Sumatra dammar | 10 wt.% |
| pigment (Watchung Red) | 16 wt.% |
| wax (polyethylene: M.W. 5400) | 3 wt.% |
| antifoaming agent (dimethylpolysiloxane) | 1 wt.% |
| plasticizer (dicyclohexylphosphate (DCHP)) | 5 wt.% |

-Continued

| | | |
|---|---|---|
| solvent (a mixture consisting of isopropanol, ethyl acetate and toluene equivalently (by volume; the same applies hereinafter)) | | 45 wt.% |
| | total | 100 wt.% |

By mixing the above components through the aforesaid process, an ink composition was prepared. Subsequently, by employing this composition for printing on a polyethylene (M.W. 150,000, Density 0.950, Melt Index 0.5) film containing 70 wt.% of calcium sulfite, the printing aptitude and film strength (adhesiveness) thereof were tested.

EXAMPLE 2.

Components:

| | | |
|---|---|---|
| acrylic resin (intrinsic viscosity: 0.030, softening point (T g): 60°C, Trade mark "BR—105" by Mitsubishi Rayon Co., Ltd.) | | 18 wt.% |
| Sumatra dammar | | 5 wt.% |
| pigment (Iron Oxide Red) | | 30 wt.% |
| wax (the same as that in Example 1) | | 3 wt.% |
| antifoaming agent (the same as that in Example 1) | | 1 wt.% |
| plasticizer (dioctylphthalate (DOP)) | | 3 wt.% |
| solvent (a mixture consisting of ethanol, ethyl acetate and methyl cellosolve equivalently) | | 40 wt.% |
| | total | 100 wt.% |

A composition consisting of the above components was evaluated through the same process as in Example 1.

EXAMPLE 3.

Components:

| | | |
|---|---|---|
| acrylic resin (intrinsic viscosity: 0.067, softening point (T g): 65°C, Trade mark "BR-101" by Mitsuibishi Rayon Co., Ltd.) | | 8 wt.% |
| Sumatra dammar | | 15 wt.% |
| pigment (Phthalocyanine Blue) | | 12 wt.% |
| wax (the same as that in Example 1) | | 3 wt.% |
| antifoaming agent (the same as that in Example 1) | | 1 wt.% |
| plasticizer (DCHP) | | 5 wt.% |
| solvent (a mixture consisting of isopropanol, toluene and ethyl cellosolve equivalently) | | 56 wt.% |
| | total | 100 wt.% |

A composition consisting of the above components was evaluated through the same process as in Example 1.

EXAMPLE 4.

Components:

| | | |
|---|---|---|
| acrylic resin (the same as that in Example 3) | | 20 wt.% |
| Sumatra dammar | | 20 wt.% |
| pigment (Carmine 6B) | | 15 wt.% |
| wax (the same as that in Example 1) | | 3 wt.% |
| antifoaming agent (the same as that in Example 1) | | 1 wt.% |
| plasticizer (DCHP) | | 3 wt.% |
| solvent (a mixture consisting of isopropanol, ethyl acetate, toluene and ethyl Cellosolve equivalently) | | 38 wt.% |
| | total | 100 wt.% |

A composition consisting of the above components was evaluated through the same process as in Example 1.

EXAMPLE 5.

Components:

| | | |
|---|---|---|
| acrylic resin (the same as that in Example 3) | | 32 wt.% |
| Sumatra dammar | | 10 wt.% |
| pigment (dis-azo yellow) | | 8 wt.% |
| wax (the same as that in Example 1) | | 3 wt.% |
| antifoaming agent (the same as that in Example 1) | | 1 wt.% |
| plasticizer (DCHP) | | 4 wt.% |
| solvent (a mixture consisting of isopropanol, ethyl acetate and toluene at the ratio of 8:1:4) | | 42 wt.% |
| | total | 100 wt.% |

EXAMPLE 6.

By employing the ink composition prepared in Example 5 for printing on a polyethylene film not containing any inorganic filler and having M.W. of 180,000; density of 0.942 and M.I. under 0.01 (which has not undergone the surface treatment), the printability and film strength thereof were tested. The result of the test is as shown later on.

COMPARATIVE EXAMPLE 1

Components:

| | | |
|---|---|---|
| polyamide resin (Trade Mark "AM-1440" by Chuo Gosei Co., Ltd.) | | 23 wt.% |
| nitrocelluose | | 5 wt.% |
| pigment (Watchung Red) | | 15 wt.% |
| wax (the same as that in Example 1) | | 3 wt.% |
| antifoaming agent (the same as that in Example 1) | | 1 wt.% |
| solvent (a mixture consisting of isopropanol, ethyl acetate and toluene at the ratio of 8:1:4) | | 53 wt.% |
| | total | 100 wt.% |

A composition consisting of the above components was evaluated through the same process as in Example 1.

COMPARATIVE EXAMPLE 2

Components:

| | | |
|---|---|---|
| nitrocellulose | | 15 wt.% |
| rosin-modified maleic acid resin | | 11 wt.% |
| pigment (TiO$_2$: 20%, Phthalocyanine Blue: 5%) | | 25 wt.% |
| wax (the same as that in Example 1) | | 3 wt.% |
| antifoaming agent (the same as that in Example 1) | | 1 wt.% |
| solvent (the same as that in Comparative Example 1) | | 45 wt.% |
| | total | 100 wt.% |

A composition consisting of the above components was evaluated through the same process as in Example 1.

COMPARATIVE EXAMPLE 3

| Components: | |
|---|---|
| ACRYLIC RESIN (intrinsic viscosity: 0.030, softening point (T g): 60°C) | 18 wt.% |
| ketone resin | 8 wt.% |
| pigment (Carmine 6B) | 16 wt.% |
| wax (the same as that in Example 1) | 3 wt.% |
| antifoaming agent (the same as that in Example 1) | 1 wt.% |
| solvent (the same as that in Comparative Example 1) | 54 wt.% |
| total | 100 wt.% |

A composition consisting of the above components was evaluated through the same process as in Example 1.

COMPARATIVE EXAMPLE 4

| Components: | |
|---|---|
| shellac | 26 wt.% |
| pigment (the same as that in Comparative Example 3) | 18 wt.% |
| wax (the same as that in Example 1) | 2 wt.% |
| antifoaming agent (the same as that in Example 1) | 1 wt.% |
| solvent (a mixture consisting of ethanol and ethyl cellulose equivalently) | 53 wt.% |
| total | 100 wt.% |

COMPARATIVE EXAMPLE 5

Test was conducted by employing the ink composition prepared in Ccomparative Example 1 for printing on the same polyethylene film as used in Example 6. The result of the test is as shown hereunder.

Result of tests

| | | Viscosity (25°C, poise) | Adhesion |
|---|---|---|---|
| Example | 1 | 3.5 | O |
| Example | 2 | 2.7 | O |
| Example | 3 | 2.1 | O |
| Example | 4 | 3.5 | O |
| Example | 5 | 4.0 | O |
| Example | 6 | 4.0 | O |
| Comparative Example | 1 | 3.5 | X |
| Example | 2 | 2.8 | Δ |
| Example | 3 | 3.0 | Δ |
| Example | 4 | 2.4 | X |
| Example | 5 | 2.4 | X |

Remark:
Evaluation of the adhesion was performed through the process comprising: sticking a piece of adhesive cellophane tape having its one side coated with an adhesive on a polyethylene film coated with the sample; pulling said tape to strip off the polyethylene film; and observing the condition of the sample on said film. In the above showing, the mark O signifies 'no stripping', mark O signifies '1-20% stripping', mark Δ signifies '20-50% stripping', and mark X signifies 'more than 50% stripping'. In addition, the printability of each Examples 1-6 was equivalent to that of each Comparative Examples 1-5.

What is claimed is:

1. In a flexo ink composition containing an organic solvent solution of a resin component as the vehicle, wherein the amount of said organic solvent is from 30 to 60 percent by weight, based on the weight of the flexo ink composition, the improvement which comprises:
  said resin component consists essentially of
    A. from 5 to 35 percent by weight, based on the weight of the flexo ink composition, of a copolymer of methacrylic acid ester and acrylic acid, said copolymer having a molecular weight in the range of 30,000 to 300,000 and a second order transition temperature in the range of 20° to 105°C, said methacrylic acid ester being selected from the group consisting of ethyl methacrylate, butyl methacrylate, isobutyl methacrylate, n-hexyl methacrylate, n-octyl methacrylate, lauryl methacrylate and stearyl methacrylate,
    and B. from 5 to 20 percent by weight, based on the weight of the flexo ink composition, of dammar having an acid value in the range of 20 to 55 and a softening
  point in the range of 55° to 110°C,
  said flexo ink composition possessing improved adhesion to untreated polyolefin sheets and to polyolefin sheets filled with inorganic powder.

2. A flexo ink composition as claimed in claim 1, wherein said organic solvent is a mixture of at least two different solvents, one of said solvents being selected from the group consisting of methyl alcohol, ethyl alcohol, isopropyl alcohol, n-propyl alcohol, n-butyl alcohol, isobutyl alcohol, t-butyl alcohol, diacetone alcohol and benzyl alcohol, said one solvent being at least one third, by weight, of the total organic solvent, the balance of said organic solvent being at least one member selected from the group consisting of ethyl acetate, butyl acetate, toluene, xylene, ethylene glycol monoethyl ether, ethylene glycol monoethyl ether and ethylene glycol monobutyl ether.

3. A flexo ink composition as claimed in claim 2, in which the amount of A is from 15 to 25 percent by weight, and the amount of B is from 8 to 15 percent by weight, both percentages based on the weight of the flexo ink composition.

* * * * *

UNITED STATES PATENT OFFICE
CERTIFICATE OF CORRECTION

Patent No. 3,912,675          Dated October 14, 1975

Inventor(s) Hiroshi Hoshi, Sakae Sakakura, Minoru Yoshida, Yoshinobu Monden, Fumio Ito and Kaoru Fujita It is certified that error appears in the above-identified patent and that said Letters Patent are hereby corrected as shown below:

Col. 6, end of line 46 and beginning of line 47; change "monoethyl" to ---monomethyl---.

Signed and Sealed this ninth Day of March 1976

[SEAL]

Attest:

RUTH C. MASON
*Attesting Officer*

C. MARSHALL DANN
*Commissioner of Patents and Trademarks*